Feb. 14, 1961 K. ELLEGAST 2,971,748
CONTINUOUS MIXER
Filed May 20, 1958 3 Sheets-Sheet 1

INVENTOR.
KONRAD ELLEGAST
BY Connolly and Hutz
his ATTORNEYS

Feb. 14, 1961 K. ELLEGAST 2,971,748
CONTINUOUS MIXER
Filed May 20, 1958 3 Sheets-Sheet 2

INVENTOR.
KONRAD ELLEGAST
BY
Connolly and Hutz
ATTORNEYS

Feb. 14, 1961  K. ELLEGAST  2,971,748
CONTINUOUS MIXER

Filed May 20, 1958  3 Sheets-Sheet 3

INVENTOR.
KONRAD ELLEGAST
BY
*Connolly and Hutz*
ATTORNEYS

United States Patent Office
2,971,748
Patented Feb. 14, 1961

2,971,748
CONTINUOUS MIXER

Konrad Ellegast, Leichlingen, Germany, assignor to Farbenfabriken Bayer Aktiengesellschaft, Leverkusen, Germany, a corporation of Germany Filed May 20, 1958, Ser. No. 736,599

Claims priority, application Germany July 3, 1957

3 Claims. (Cl. 259—7)

The present invention relates to an apparatus for continuously mixing two or more liquids.

Mixers are known for the continuous bubble-free mixing of liquids, in which the components to be mixed are fed from below through a mixer housing and are discharged at the upper end. In this arrangement, the measuring out of the components takes place under pressure and the components supplied in smaller quantities are introduced through a nozzle valve into the flowing stream of the main component. If the rates of flow are for example between 100 and 1000 cc. per minute and if the upper mixing ratio is for example 1:60, then the quantity of the secondary component is so small that the main component, of which there can be a flow of up to 60 times the quantity of said secondary component, can pass because of back pressure into the supply pipe of the secondary component, especially when the viscosity of the main component is higher than that of the secondary component. If the prepared mixture has a tendency to solidify, then the supply pipe for the secondary component can become clogged. This is explained in the following example:

A polyester isocyanate is to have admixed therewith a polyalcohol in the quantitative proportion of (a) 1.6% to (b) 8% of polyalcohol. With a total flow rate of 100 g. per minute, this proportion is therefore (a) 1.6 g. to (b) 8 g. of polyalcohol per minute.

If the rate of flow is increased to 1000 g. per minute then the amount of polyalcohol to be added every minute is 16 g. in case (a) and 80 g. in case (b).

The rate of flow of the polyalcohol therefore varies from 1.6 to 80 g./minute or in the ratio 1:50. Although it is still possible with relatively large quantities of polyalcohol to supply these to the main component continuously and under pressure, this is no longer the case when 1.6 g./minute of polyalcohol are used since there is in practice no longer a continuous flow with this small quantity.

It has now been found that a satisfactory mixing is obtained over the entire range indicated above if the liquids to be mixed are supplied according to the invention axially towards a disc-type stirrer which rotates in a closed housing and has a set of blades upon one face which pump centrifugally and another set of stirrer blades upon its other face which operate centripetally in opposition to the centrifugal blades. By rotation of the stirrer device, a suction is set up in the flow duct of the components, this suction preventing the main component, for example a polyester isocyanate, from entering the flow pipe of the secondary component, for example a polyalcohol.

Novel features and advantages of the present invention will become apparent to one skilled in the art from a reading of the following description in conjunction with the accompanying drawings wherein similar reference characters refer to similar parts and in which.

Figure 1:
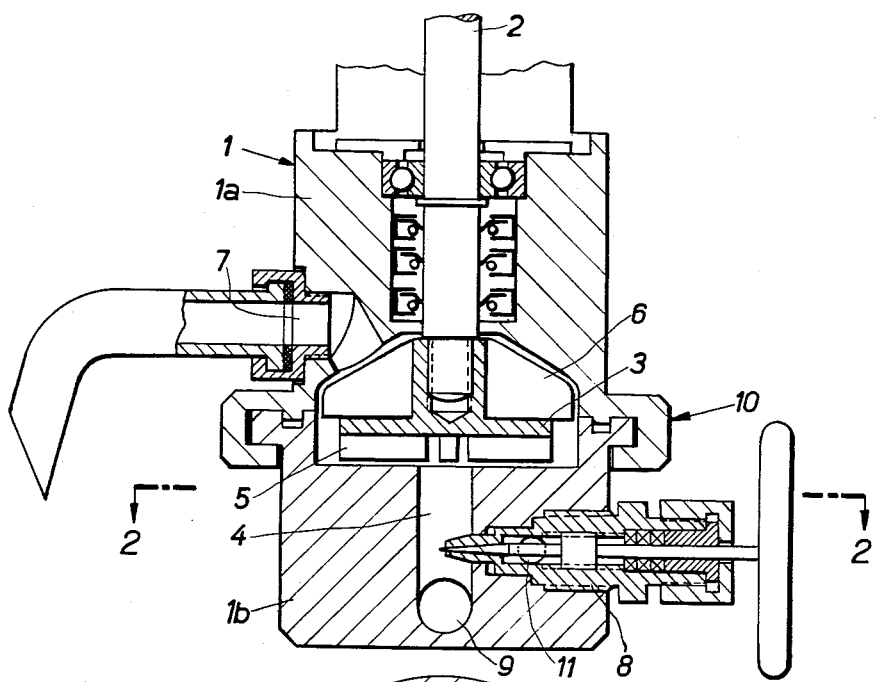
Fig. 1 is a cross-sectional view in elevation of one embodiment of this invention.
Figure 2:
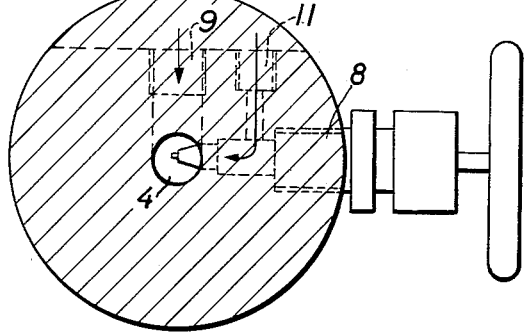
Fig. 2 is a cross-sectional view taken through Fig. 1 along the line 2—2.
Figure 4:
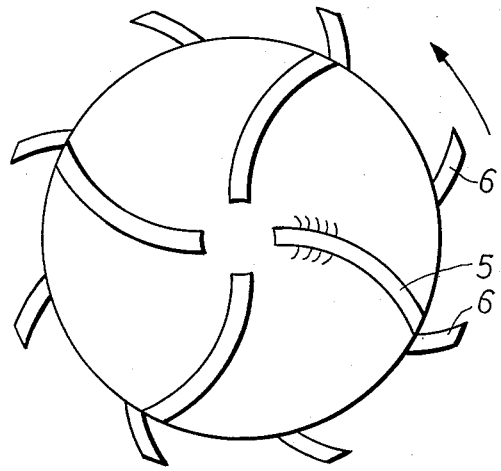
Fig. 4 is a bottom plan view of the portion shown in Fig. 3.
Figure 3:
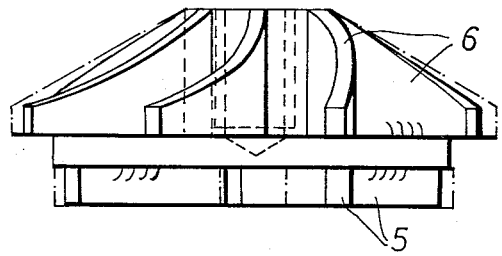
Fig. 3 is a view in elevation of a stirrer disc which is a portion of the embodiment shown in Fig. 1.
Figure 5:
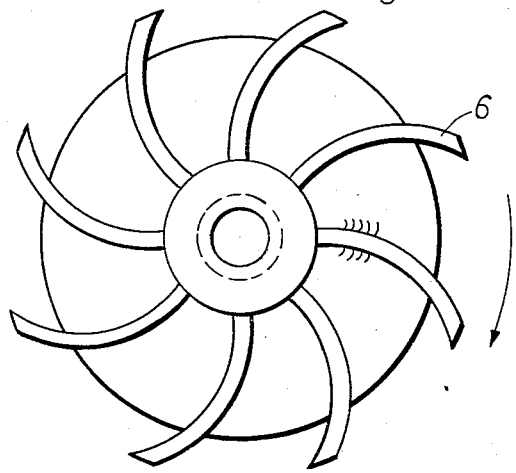
Fig. 5 is a top plan view of the portion shown in Fig. 3.
Figure 6:
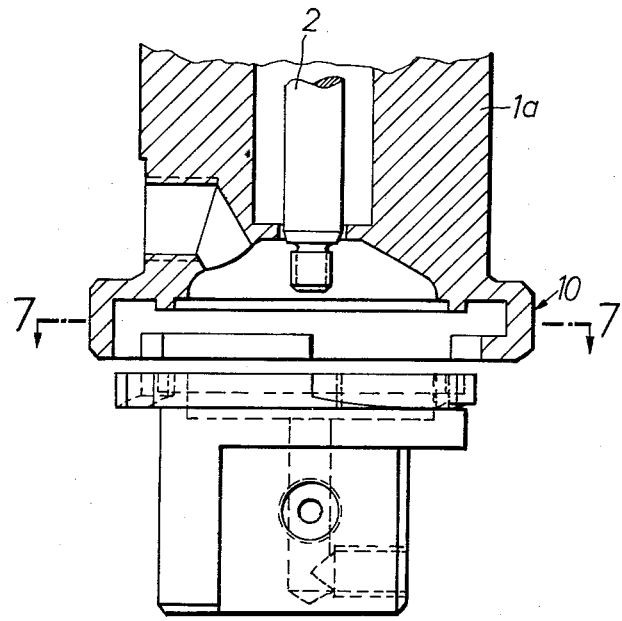
Fig. 6 is an exploded view of portions of the housing of the embodiment shown in Fig. 1.
Figure 7:
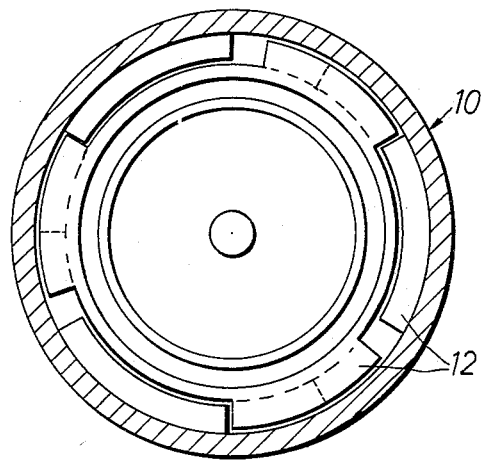
Fig. 7 is a cross-sectional view taken through Fig. 6 along the line 7—7.

One embodiment of the invention is shown diagrammatically and by way of example in the drawing. The mixer consists of a small mixer housing 1 which can be quickly separated into two parts 1a and 1b by a bayonet connection 10, including interlocking annular plates 12, and into which a sealed driving shaft 2 for a disc-type stirrer 3 projects from above. The two liquids to be mixed are jointly introduced through the lower part 1b of the housing and axially towards the stirrer device 3, the component being supplied in a smaller quantity (secondary component) entering by way of a pipe 11 and a needle valve 8 and thence into the flow duct 4 of the main component, which is introduced through the duct 9. Fitted, for example, on the underside of the stirrer device 3 are blades 5 which are swept backwardly from their direction of movement similar to those of a centrifugal pump, and when these blades are set in rotation (approximately 3000 r.p.m.) they draw in the two initially mixed liquids from the duct 4. By this means, a harmful back pressure in the flow duct 4 is avoided. The mixing takes place mainly at the periphery of the plate by the action of projecting guide blades 6 on the upper side of the plate, these blades being so arranged, for example, by being swept forwardly in their direction of movement that the mixture is conveyed centripetally thereby. The edges of the centripetal blades protrude, for example, a short distance past the edges of the stirrer disc. The main effect is set up on the projecting parts of the mixing blades in the region where the speed of rotation is at its maximum. A convenient space is provided within the cylindrical wall of the mixing housing cavity between the edges of the centrifugal blades and the cylindrical wall within which the liquid passes from the outer edge of the centrifugal blades 5 into the protruding edges of centripetal blades 6. The mixing disc can also be so designed that the lower guide blades project beyond the edge of the plate.

The bubble-free mixture discharges through the outlet opening 7 in the upper part 1a of the mixer housing.

I claim:

1. An apparatus for continuously mixing a number of liquids comprising a mixer housing including a cavity, a disc-type stirrer rotatably mounted within said cavity, said housing including an inlet duct connected to said cavity at a portion thereof adjacent one face of said stirrer and an outlet duct connected to said cavity at a point adjacent a central portion of the other face of said stirrer, radially directed blades mounted upon both faces of said stirrer, drive means connected to said stirrer for rotating it in one direction, said blades upon the face of the stirrer disposed adjacent said inlet conduit being swept backwardly away from their direction of rotational movement for imparting a centrifugal pumping action upon liquid within said inlet duct and inducing said liquid to flow into said cavity and radially outwardly through the centrifugally-pumping blades, said blades upon the face of said stirrer adjacent said outlet duct being swept forwardly in their direction of rotational movement for acting centripetally upon said liquid and inducing it to flow radially inwardly through the centripetally-acting blades and into said outlet passageway in a thoroughly mixed condition, said backwardly-swept blades terminating substantially at the periphery of said stirrer, said forwardly-swept blades extending a short distance past the edge of said stirrer, and said cavity including a cylindrical wall enclosing both of said blades which provides a space between the outer edges of said backwardly-swept blades and the protruding edges of said forwardly-swept blades for conducting said liquid through the outer edges of said backwardly-swept blades into the protruding edges of said forwardly-swept blades.

2. An apparatus as set forth in claim 1 wherein said backwardly swept blades are terminated a short distance from each other at the center of said stirrer to provide an eye adjacent said inlet duct into which said liquid is drawn.

3. An apparatus as set forth in claim 1 wherein a needle valve is mounted within said inlet duct for introducing a minor amount of one of said liquids into said inlet duct.

References Cited in the file of this patent

UNITED STATES PATENTS

| | | |
|---|---|---|
| 1,213,889 | Lawaczeck | Jan. 30, 1917 |
| 1,363,315 | Dron | Dec. 28, 1920 |
| 1,862,906 | Preieuthner | June 14, 1932 |
| 2,295,121 | McLean | Sept. 8, 1942 |
| 2,478,893 | Brant | Aug. 16, 1949 |
| 2,612,354 | Dron | Sept. 30, 1952 |
| 2,736,534 | Atkins | Feb. 28, 1956 |
| 2,767,965 | Daman | Oct. 23, 1956 |
| 2,769,622 | Jensen | Nov. 6, 1956 |
| 2,788,337 | Preiswerk et al. | Apr. 9, 1957 |

FOREIGN PATENTS

| | | |
|---|---|---|
| 452,740 | Germany | 1927 |